Figure 4:
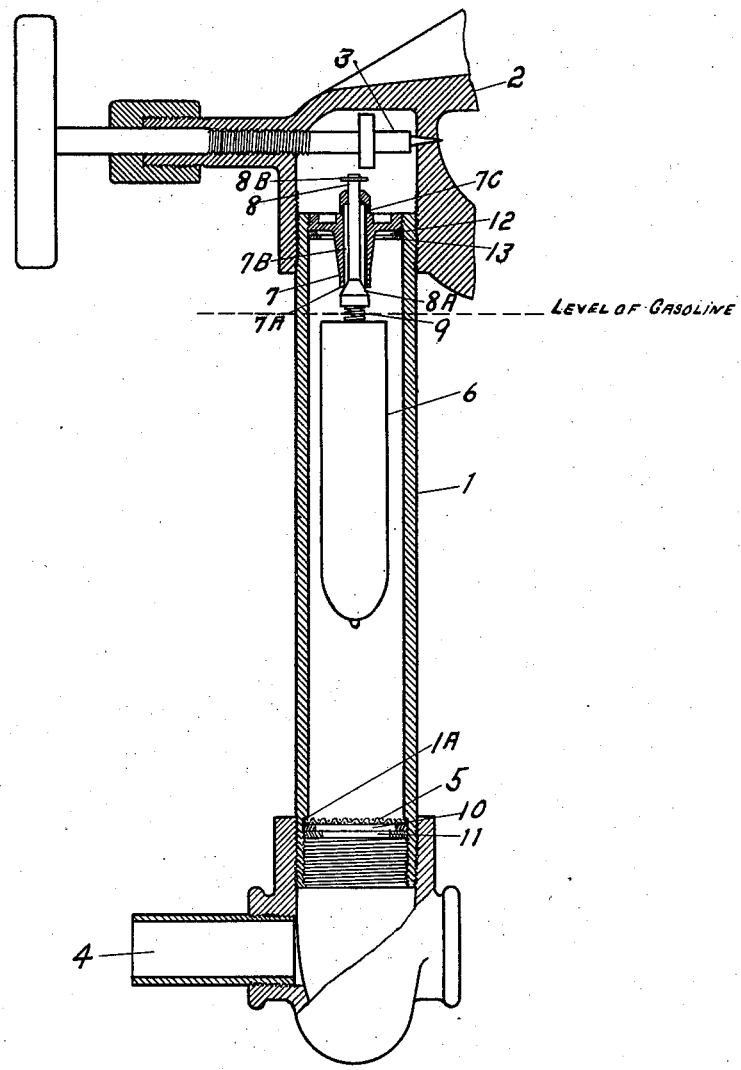

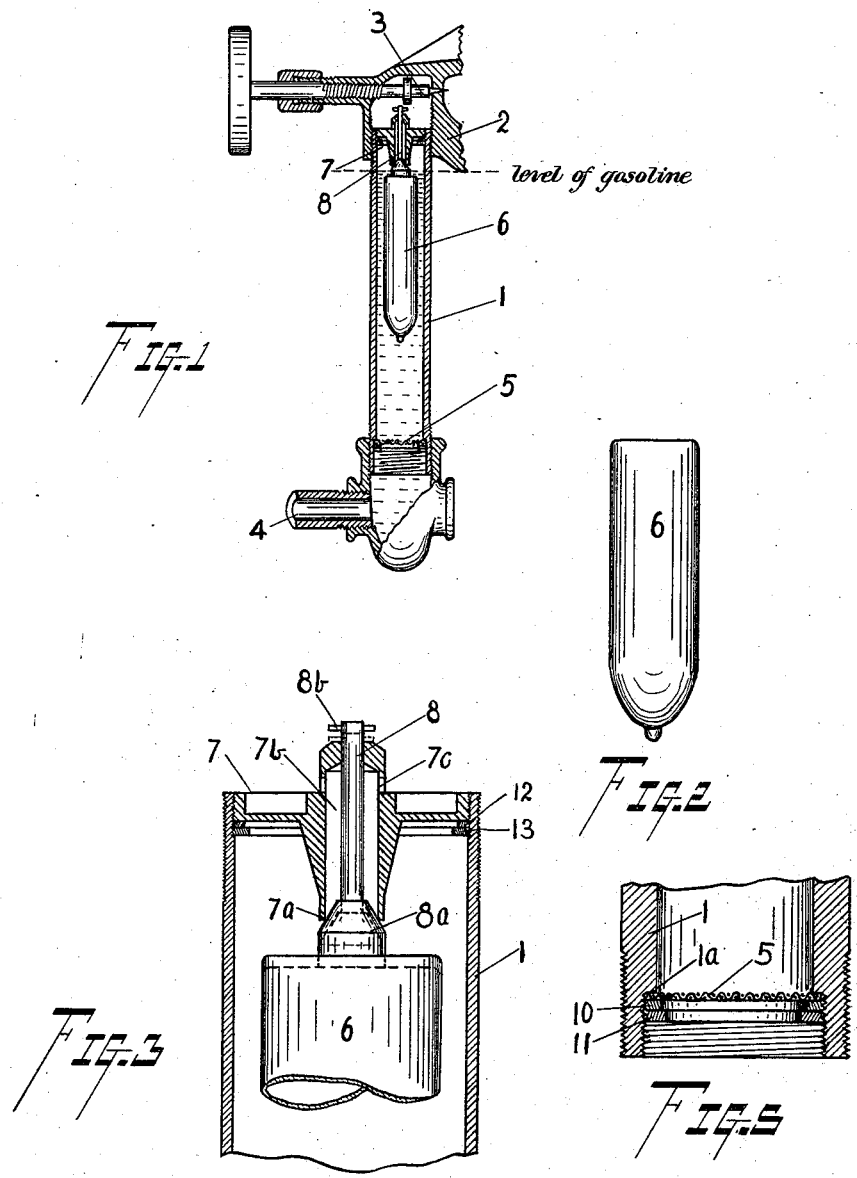

UNITED STATES PATENT OFFICE.

GLENN H. BURGESS, OF ST. LOUIS, MICHIGAN.

SAFETY STAND-PIPE FOR GASOLENE-STOVES.

1,015,779.  Specification of Letters Patent.  Patented Jan. 30, 1912.

Application filed January 4, 1911. Serial No. 600,735.

*To all whom it may concern:*

Be it known that I, GLENN H. BURGESS, a citizen of the United States, residing at St. Louis, in the county of Gratiot and State of Michigan, have invented certain new and useful Improvements in Safety Stand-Pipes for Gasolene-Stoves; and I do hereby declare the following to be a full, clear, and exact description of the invention, such as will enable others skilled in the art to which it appertains to make and use the same.

This invention pertains to certain constructions and arrangements of parts in a "stand pipe" of that type in which the burner of a gasolene stove is equipped with a needle valve, the supply to which is received through a downwardly projecting pipe into the bottom of which gasolene is fed from any source of supply, as the usual overhead reservoir.

It has been customary to fit the stand pipe with a valve, and to provide in the stand pipe a float connected to the valve so that when the stand pipe is full of liquid gasolene, the float is lifted and operates to close the valve, thereby preventing additional gasolene from entering the stand pipe. The object of such devices is to prevent "flooding" the burner, that is, to prevent liquid gasolene from pouring out of the burner when the flame is blown out.

It has been customary to provide safety stand pipes of the character above described, with a metal float connected by a small chain with the valve below, but it has been found in practice that such floats gradually fill with gasolene and become inoperative, although there may be no opening in the float that can be detected by the eye or by ordinary methods of testing. The chains by which such floats are connected to their valves frequently become entangled and this fact, together with the gradual seepage of gasolene through the metal float as above described, makes it difficult to determine whether the float and valve are in proper working condition, because the change from good operation to inoperativeness usually occurs very gradually. It may take place in a day or may require a year, depending upon conditions that are not possible to investigate while the apparatus is in use.

It is the object of my present invention to provide a float made of glass hermetically sealed and preferably exhausted of air, whereby tightness of the float is assured, or if it becomes defective the user is at once warned. If such a float become defective as by being cracked or broken, it immediately fills with liquid gasolene and goes out of operation, in which case the defect is at once apparent and can be easily remedied by inserting a new float.

I further provide a valve operated by the glass float, but the valve is so arranged as to have no mechanical connection with the float except when the float is raised to close the valve. I thereby avoid the use of the chains and mechanical connections between the float and valve previously referred to.

I also provide means for readily disassembling the stand pipe and removing the valve and float, and also for straining the gasolene.

With these and certain other objects in view, which will appear later in the specifications, my invention consists in the devices illustrated in the accompanying drawings and the equivalents thereof, in which—

Figure 1 is a vertical section through the stand pipe; Fig. 2 is a side view of the hermetically sealed float; Fig. 3 is an enlarged sectional detail of the upper part of the stand pipe; Fig. 4 is a sectional elevation showing the modified construction of the valve stem, and Fig. 5 is an enlarged sectional detail of the lower part of the stand pipe.

1 represents the stand pipe which is screwed or otherwise secured to the case 2 of the usual needle valve 3 of a gasolene burner (not shown).

4 is the supply pipe conducting liquid gasolene to the stand pipe 1, preferably under small pressure, as for instance that due to the elevation of a reservoir such as is ordinarily used in gasolene stoves.

5 is a strainer preferably made of fine gauze.

6 is the float preferably made in the form of a glass tube hermetically sealed and preferably partially exhausted of its air. The air is partially exhausted for the purpose of making the float lighter and also to cause it to fill with gasolene quickly and to thereby become wholly inoperative should the glass become broken or cracked.

An apertured metal plug 7 is removably secured in the top of the stand pipe 1 and made tight by a washer 12 which is held in place by a threaded ring 13 screwed into the stand pipe. The plug 7 has a valve seat $7^a$ at the lower extremity of its aperture 7ᵇ. The valve 8 having an inclined face 8ᵃ is inserted in the aperture 7ᵇ and has a limited up and down movement, as indicated in Fig. 3. A pin or other suitable means 8ᵇ holds the valve in place. When the float 6 lifts, the top of the float contacts with the bottom of the valve and lifts the valve, thereby closing the aperture 7ᵇ and preventing gasolene or gasolene vapor from passing out of the stand pipe, through the holes 7ᶜ and past the needle valve 3. To avoid liability of fracturing the glass float 6 when it suddenly rises and comes in contact with the bottom of the valve 8, I prefer to provide a coiled spring 9 or other suitable cushioning device, as indicated in Fig. 4, on the lower face of the valve 8.

The screen 5 may be held in place in any suitable manner, as for instance that indicated in Fig. 5, in which 1ᵃ is an annular shoulder formed on the inside of the stand pipe 1, against which the circular screen 5 rests. A packing ring 10 is inserted and held in place by a threaded ring 11 screwed into the lower threaded portion of the stand pipe 1.

The mode of operation of the stand pipe is as follows: The stand pipe being filled with gasolene, the float 6 lifts and closes valve 8. The burner is heated by means of a separate gasolene torch (not shown) and when it begins to generate, the needle valve 3 is opened. The heat of the gasolene causes a slight pressure in the stand pipe 1 and in turn causes the float to lower slightly, thereby opening the valve 8 and allowing the gasolene vapor in the upper extremity of the stand pipe to pass out through the needle valve 3. During the ordinary use of the burner the parts in the stand pipe remain as above described, but should the flame be blown out, thereby causing the burner to cease generating, the stand pipe fills with liquid gasolene, raising the float to the top of its travel and causing it to close the valve 8 and prevent flooding the burner. If, for any reason, the float becomes defective, it immediately fills with gasolene and sinks, a condition which becomes at once apparent from the operation of the burner. The float may then be readily replaced by taking out the screen 5 and inserting a new float.

Having described my invention, what I claim and desire to secure by Letters Patent, is as follows:

1. The combination with a gasolene burner, of a downwardly projecting stand pipe connected therewith, a valve secured in the upper part of said stand pipe, a glass float in said stand pipe, said float being partially exhausted of air and having no mechanical connection with said valve but adapted to raise and thereby close the valve when the float lifts, and cushioning means carried by said valve and adapted to contact with said float, for the purposes set forth.

2. The combination with a gasolene burner, of a downwardly projecting stand pipe connected therewith, a valve secured in the upper part of said stand pipe, and a glass float in said stand pipe, said valve having means adapted to contact with said float, said float being partially exhausted of air and having no mechanical connection with said valve but adapted to raise and thereby close the valve when the float lifts.

In testimony whereof, I affix my signature in presence of two witnesses.

GLENN H. BURGESS.

Witnesses:
CHRISTINE A. BRAIDEL,
GEO. W. SMITH.

---

Copies of this patent may be obtained for five cents each, by addressing the "Commissioner of Patents, Washington, D. C."